(12) United States Patent
Komai

(10) Patent No.: US 8,289,582 B2
(45) Date of Patent: Oct. 16, 2012

(54) OPTICAL BEAM SCANNING APPARATUS AND DIGITAL WRITING APPARATUS

(75) Inventor: Kunihiro Komai, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 563 days.

(21) Appl. No.: 12/354,966

(22) Filed: Jan. 16, 2009

(65) Prior Publication Data

US 2009/0185242 A1 Jul. 23, 2009

(30) Foreign Application Priority Data

Jan. 21, 2008 (JP) ................................ 2008-010479

(51) Int. Cl.
*H04N 1/04* (2006.01)
*B41J 2/47* (2006.01)
*B41J 2/455* (2006.01)
*B41J 2/435* (2006.01)
*G03G 13/04* (2006.01)
*G03G 21/14* (2006.01)
*G01D 15/06* (2006.01)
*G01D 15/16* (2006.01)

(52) U.S. Cl. ........ 358/474; 347/234; 347/129; 347/232; 347/116; 347/233; 347/248; 346/116; 399/76

(58) Field of Classification Search .................. 358/474; 347/234, 129, 232, 116, 233, 248; 346/116; 399/76

See application file for complete search history.

(56) References Cited

U.S. PATENT DOCUMENTS 7,158,160 B2 * 1/2007 Shiraishi ........................ 347/116
7,733,362 B2 * 6/2010 Kanzaki et al. ................ 347/236
2007/0263270 A1 11/2007 Komai et al.

FOREIGN PATENT DOCUMENTS

JP 2003-29181 1/2003

* cited by examiner

*Primary Examiner* — Charlotte M Baker
*Assistant Examiner* — Rury Grisham
(74) *Attorney, Agent, or Firm* — Oblon, Spivak, McClelland, Maier & Neustadt, L.L.P.

(57) ABSTRACT

An optical beam scanning apparatus is disclosed, including: a laser source that emits an optical beam, a deflection part that deflects the optical beam, a light receiving part that receives a returning light of the optical beam which is deflected toward the laser source by the deflection part, a signal generation part that generates a synchronization detection signal, and an optical source drive part that conducts a lighting control of the laser source. The light receiving part is arranged in vicinity to the laser source. The signal generation part detects a timing at which the light receiving part receives the returning light, by an output signal from the light receiving part to generate the synchronization detection signal. The optical source drive part conducts the lighting control of the laser source in response to the synchronization detection signal as a reference.

8 Claims, 9 Drawing Sheets

OPTICAL BEAM SCANNING APPARATUS AND DIGITAL WRITING APPARATUS

BACKGROUND OF THE INVENTION

1. Field of the Invention

The present invention is related to an optical beam scanning apparatus, and more particularly to the optical beam scanning apparatus and a digital writing apparatus, which are mounted in an image forming apparatus implementing an optical beam scan method and perform image writing.

2. Description of the Related Art

An image forming apparatus such as a digital composition apparatus and a laser printer for conducting an image form in an optical beam scan method includes an optical beam scanning apparatus for controlling a laser diode to turn on and for deflecting an optical beam emitted from the laser diode by using a polygon mirror which is rotating to scan in the main scan direction, in order to write an image for each of main scan lines on a photosensitive drum.

In the above-described optical beam scanning apparatus, for example, as disclosed in Japanese Laid-open Patent Application No. 2003-29181, in order to make an image writing position be constant on the photosensitive drum for each of the main scan lines, a sensor (hereinafter, referred as a synchronization detection sensor) is generally mounted to detect an optical beam outside an image writing area at an image writing start side. The optical beam being scanned by the polygon mirror is detected by the sensor, and a lighting timing of the laser diode is regulated by using a synchronization detection signal, which is generated, as a reference.

FIG. 1 is a diagram illustrating a schematic configuration of a conventional optical beam scanning apparatus 200. The optical beam scanning apparatus 200 illustrated in FIG. 1 includes laser diodes 202Y, 202M, 202C, and 202K, a polygon mirror 204 for deflecting the optical beam emitted from the laser diodes 202Y through 202K, scan lenses (fθ lens) 206a and 206b for making the optical beam being deflected by the polygon mirror 204 scan on a subject scan surface at the same speed, a first mirrors 212a and 212b respectively forming a reflecting mirror group, synchronization detection sensors 210a and 210b respectively for detecting the optical beam, and mirrors 208a and 208b respectively for reflecting the optical beam being outside a direction toward the subject scan surface to direct the optical beam to the synchronization detection sensors 210a and 210b.

The optical beam scanning apparatus 200 illustrated in FIG. 1 is configured as an optical beam scanning apparatus of a bidirectional scan type. The laser diodes 202C through 202K are implemented for Cyan (C), Magenta (M), Yellow (Y), and Black (K), respectively. In order to deflect a beam light for each color, an upper portion and a lower portion are separately used in each reflection surface of the polygon mirror 204. The laser diodes 202K and 202Y for black and yellow emit optical beams to the lower portion of the reflection surface of the polygon mirror 204 and the laser diodes 202C and 202M for cyan and magenta emit optical beams to the upper portion of the reflection surface of the polygon mirror 204. The optical beams emitted from the laser diodes 202Y and 202M are reflected on the reflection surface of the polygon mirror 204, pass the scan lens 206b, are reflected at the first mirror 212b, and are scanned on corresponding photosensitive drums by a rotation of the polygon mirror 204. Also, the optical beams enter the synchronization detection sensor 210b mounted at an edge of the writing start side in a main scan direction. When detecting an incidence light of the optical beam, the synchronization detection sensor 210b outputs a synchronization detection signal which is a reference of controlling a lighting of a corresponding laser diode. In the same manner, optical beams emitted from the laser diodes 202K and 202C for black and cyan pass the scan lens 206a, are reflected at the first mirror 212a, and are scanned on corresponding photosensitive drums. When detecting an incidence light of the optical beam, the synchronization detection sensor 210a outputs a synchronization detection signal.

However, in the above-described conventional configuration, since the synchronization detection sensors 210a and 210b are used for the lighting control of the laser diodes 202C through 202K, spaces for mounting the synchronization detection sensors 210C and 210K and spaces for leading the optical beams to the corresponding synchronization detection sensors 210a and 210b are required. Also, the synchronization detection sensors 210a and 210b and optical elements are costly. In addition, the conventional configuration is not suitable for reducing the spaces and costs.

SUMMARY OF THE INVENTION

The present invention solves or reduces one or more of the above problems.

In an aspect of this disclosure, there is provided an optical beam scanning apparatus, including a laser source configured to emit an optical beam; a deflection part configured to deflect the optical beam; a light receiving part arranged in a vicinity of the laser source and configured to receive a returning light of the optical beam which is deflected toward the laser source by the deflection part; a signal generation part configured to detect a timing at which the light receiving part receives the returning light, by an output signal from the light receiving part, and to generate a synchronization detection signal; and an optical source drive part configured to conduct a lighting control of the laser source in response to the synchronization detection signal as a reference.

In another aspect of this disclosure, there is provided a digital writing apparatus, including: a laser source configured to emit an optical beam; a deflection part configured to deflect the optical beam; a light receiving part arranged in a vicinity of the laser source and configured to receive a returning light of the optical beam which is deflected toward the laser source by the deflection part; a signal generation part configured to detect a timing at which the light receiving part receives the returning light, by an output signal from the light receiving part, and to generate a synchronization detection signal; and an optical source drive part configured to conduct a lighting control of the laser source in response to the synchronization detection signal as a reference.

BRIEF DESCRIPTION OF THE DRAWINGS

In the following, embodiments of the present invention will be described with reference to the accompanying drawings.

DESCRIPTION OF THE PREFERRED EMBODIMENT

In the following, the present invention will be described in the embodiment but is not limited to the following embodiment. In the following embodiment, as one example of an optical beam scanning apparatus, a case of using an optical writing apparatus implemented in a laser printer will be illustrated.

Figure 1:
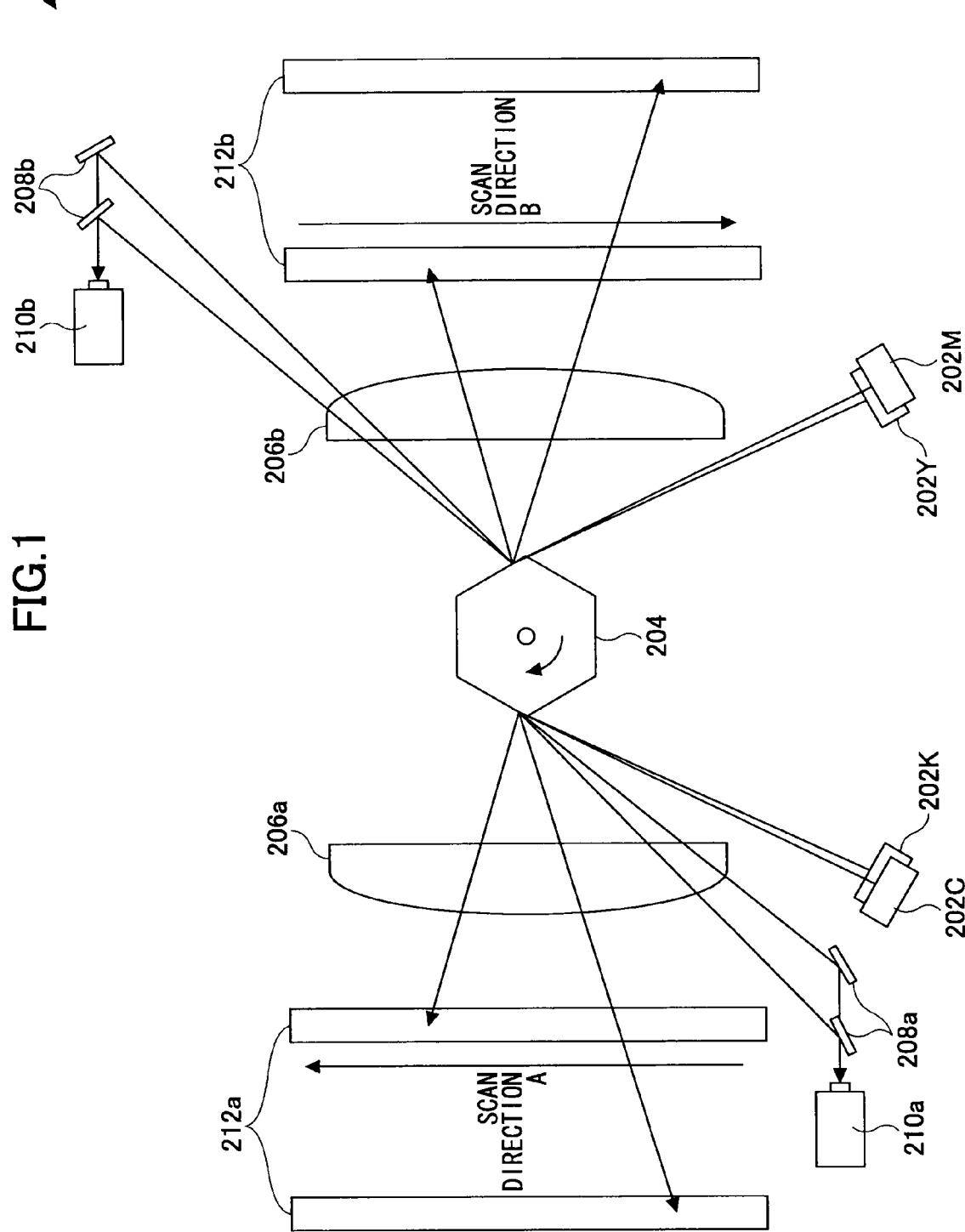
FIG. 1 is a diagram illustrating a schematic configuration of an optical beam scanning apparatus.
Figure 2:
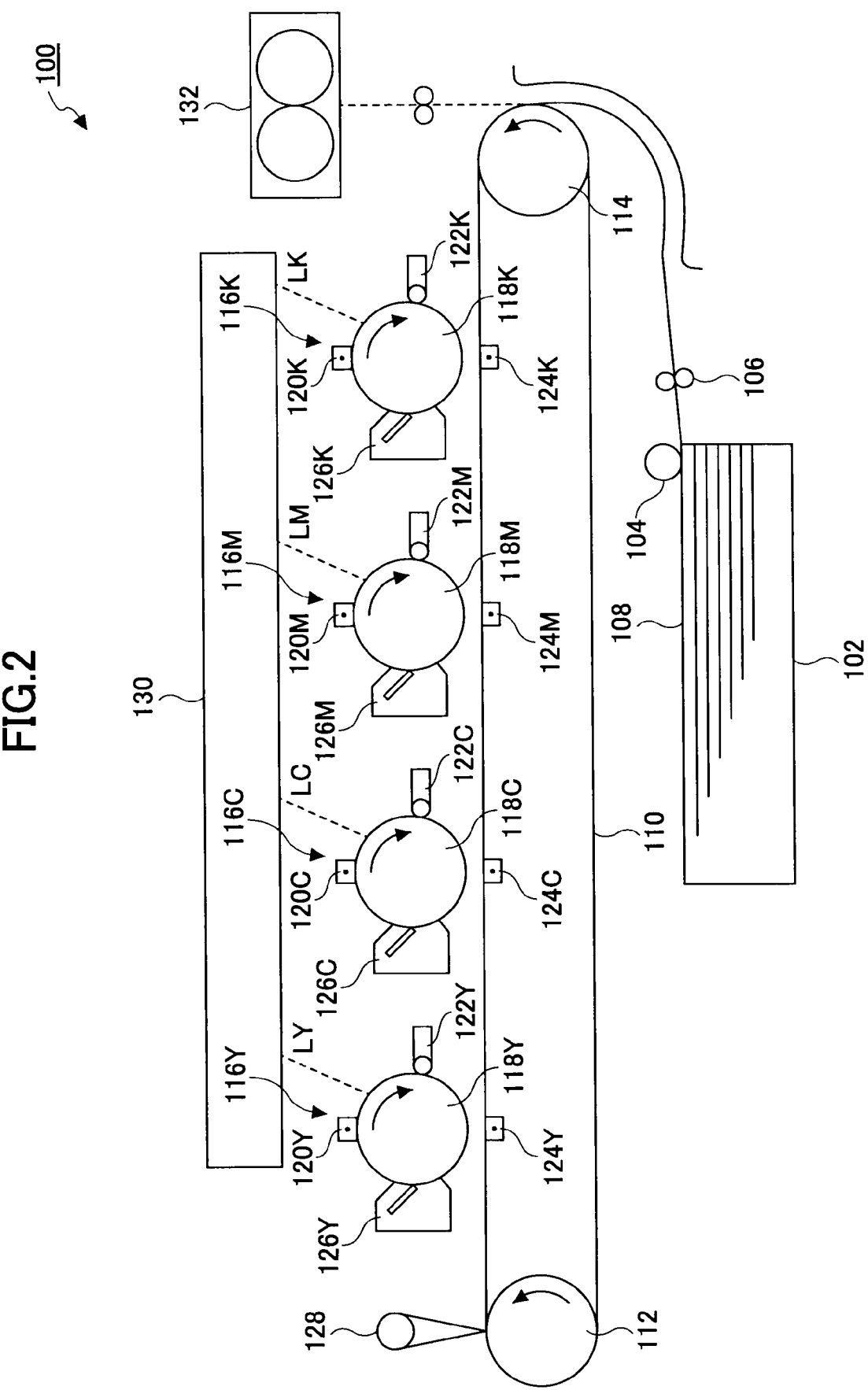
FIG. 2 is a diagram illustrating a laser printer according to an embodiment of the present invention.

FIG. 2 illustrates a laser printer according to an embodiment of the present invention. A laser printer 100 illustrated in FIG. 2 includes a paper supply part which includes a paper supply tray 102, a paper supply roller 104, and a separation roller 106, an optical writing apparatus 130 which includes optical elements such as a laser diodes, a polygon mirror, lenses, and alike, image formation parts 116K, 116M, 116C, and 116Y which include corresponding photosensitive drums 118K, 118M, 118C, and 118Y, electrification devices 120K, 120M, 120C, and 120Y, development devices 122K, 122M, 122C, and 122Y, transfer devices 124K, 124M, 124C, and 124Y, static eliminating devices 126K, 126M, 126C, and 126Y, a photosensitive cleaner (not shown), and a like, a transfer and fixing part which includes a transfer belt 110, a following roller 112, a driving roller 114, a fixing device 132, a cleaning blade 128, and a like.

In the laser print 100 illustrated in FIG. 2, the image formation parts 116K, 116M, 116C, and 116Y for black (K), magenta (M), cyan (C), and yellow (Y) are arranged along the transfer belt 110 in a tandem configuration. In the optical writing apparatus 130, optical beams, which are emitted from the laser diodes corresponding to black, magenta, cyan, and yellow, are emitted as optical beams LK, LM, LC, and LY, expose and scan on outer peripheral surfaces of the photosensitive drums 118K, 118M, 118C, and 118Y, and form electrostatic latent images, respectively. A scan direction of the optical beams is defined as a main scan direction, and a direction orthogonal to the main scan direction is a sub-scan direction.

After being uniformly electro-statically charged, the outer peripheral surfaces of the photosensitive drums 118K, 118M, 118C, and 118Y are exposed by the optical beams emitted from the optical writing apparatus 130 to form an image shape. Formed electrostatic latent images are carried to the development devices 122K, 122M, 122C, and 122Y due to rotations of the photosensitive drums 118K, 118M, 118C, and 118Y. The electrostatic latent images are developed by developing pigments; images are formed on the photosensitive drums 118K, 118M, 118C, and 118Y, and are supported. The developed images are carried to the transfer and fixing part according to the rotations of the photosensitive drums 118K, 118M, 118C, and 118Y, and are transferred to the transfer belt 110 by the transfer devices 124K, 124M, 124C, and 124Y at positions where the photosensitive drums 118K, 118M, 118C, and 118Y contact to the transfer belt 110. After residual developing pigments on the outer peripheral surfaces are swept off by a photosensitive cleaner, electrostatics of portions, where the developed images of the photosensitive drums 118K, 118M, 118C, and 118Y are transferred, are eliminated by the static eliminating devices 126K, 126M, 126C and 126Y, and are supplied to a next image formation process.

The transfer belt 110 is rotated by the driving roller 114 being rotated and driven and the following roller 112, and carries the developed images being transferred to the image formation parts 116K, 116M, 116C and 116Y in an order of black (K), magenta (M), cyan (C), and yellow (Y). Each of the developed images is registered and superimposed. By passing the image formation parts 116K, 116M, 116C, and 116Y for four colors, a multi-color developed image is formed on the transfer belt 110.

Transfer members 108 such as high quality papers, plastic sheets, and a like, which are stored in the paper supply tray 102, are separately supplied by the paper supply roller 104 and the separation roller 106, and receive a transfer of the multi-color developed image at a location where the transfer member 108 contacts to the transfer belt 110. After the transfer, the transfer member 108 on which the multi-color develop image is formed is supplied to the fixing device 132. The fixing device 132 includes a fixing member such as a fixing roller or a like including a silicon rubber, a fluororubber, or a like. The fixing device 132 presses and applies heat to the transfer member 108 and the multi-color developed image to form an image on the transfer member 108, and fixes the formed image on the transfer member 108. A printed matter being fixed is ejected on a predetermined ejected paper tray (not shown) by a predetermined paper ejecting unit (not shown). After transferring the multi-color developed image and eliminating residual development powders by the cleaning blade 128, the transfer belt 110 is supplied to the next image formation process.

Figure 3:
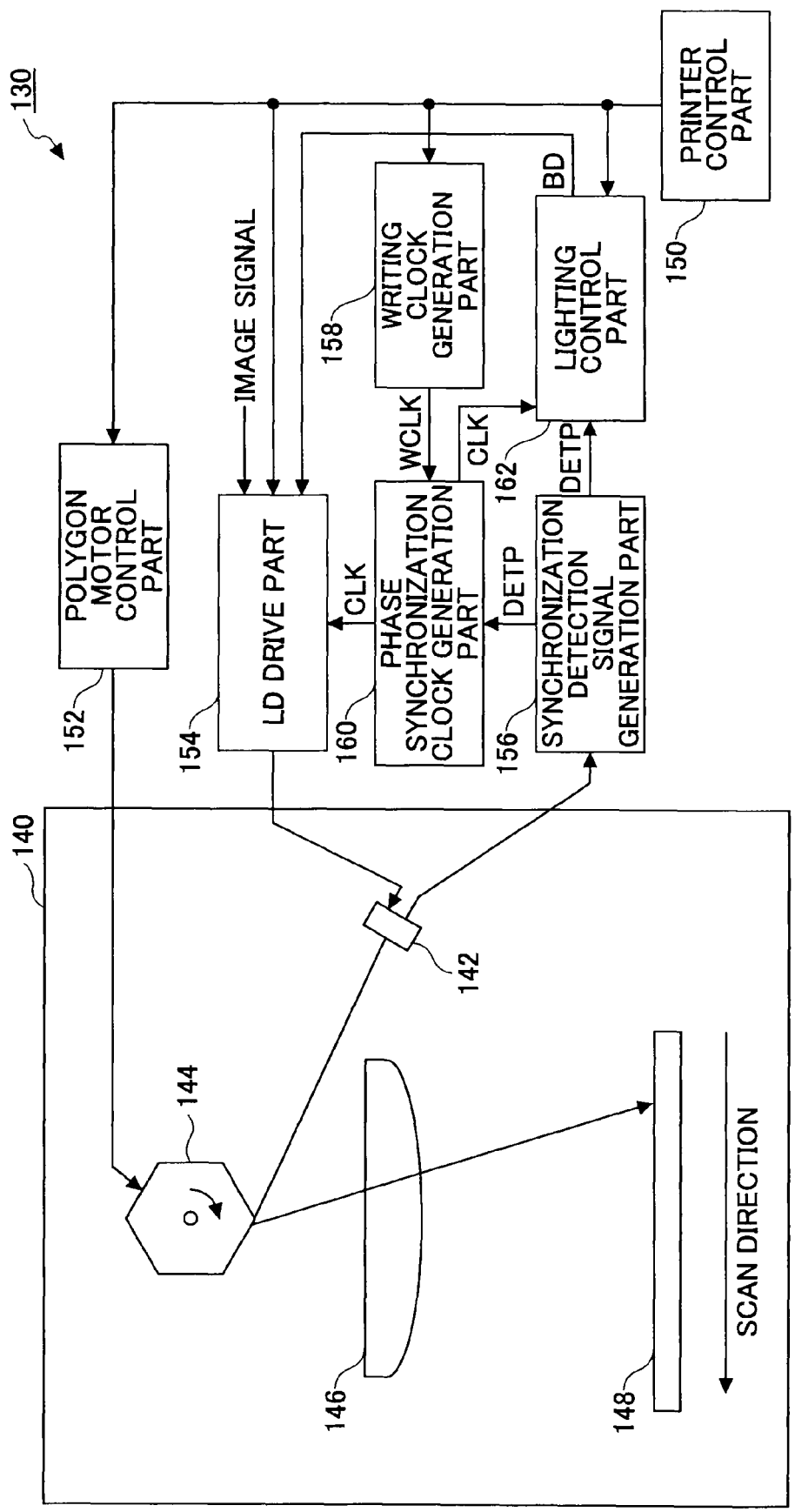
FIG. 3 a schematic diagram illustrating an optical writing apparatus included in the laser printer.

FIG. 3 is a schematic diagram illustrating a configuration of the optical writing apparatus implemented in the laser printer according to the embodiment of the present invention. The optical writing apparatus 130 includes various optical elements and a control part. In FIG. 3, a configuration concerning a single color (for example, black) is illustrated. The optical writing apparatus 130 illustrated in FIG. 3 includes an optical unit 140 which includes an LD (Laser Diode) unit 142, a polygon mirror 144 for deflecting an optical beam emitted from the LD unit 142, a scan lens (fθ lens) 146 for the optical beam deflected by the polygon mirror 144 to scan on a subject scan surface at the same speed, and a first mirror 148 forming a reflecting mirror group. In FIG. 3, a scan direction of the optical beam is indicated by an arrow.

The optical writing apparatus 130 further includes a printer control part 150, an LD drive part 154, a synchronization detection signal generation part 156, a writing clock generation part 158, a phase synchronization clock generation part 160, and a lighting control part 162 for a synchronization detection, which are operated under a control of the printer control part 150, and controls the lighting operation of the LD unit 142.

Figure 4:
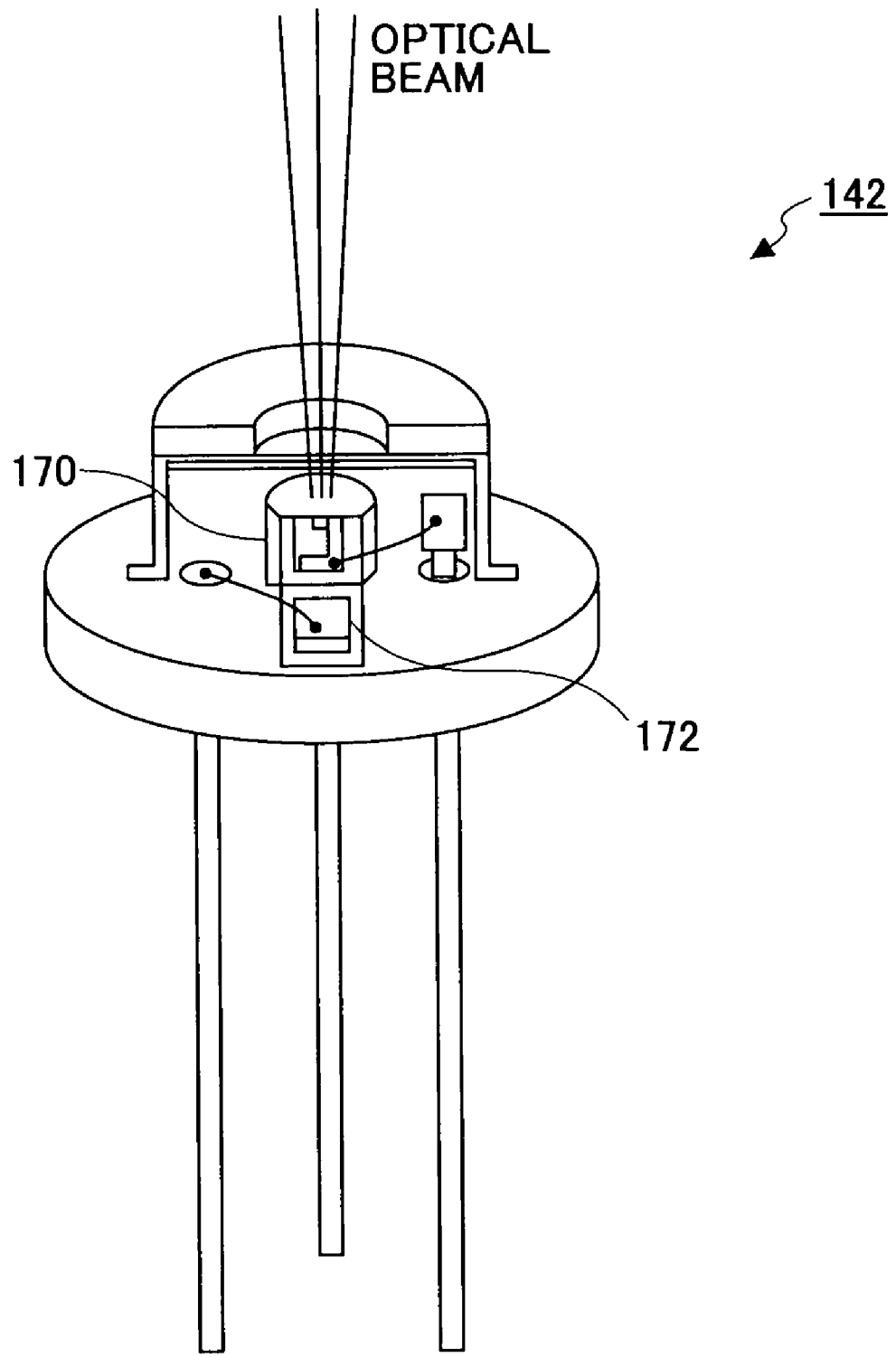
FIG. 4 is a diagram illustrating a schematic configuration of an LD unit.

In this embodiment, the LD unit 142 includes a light emitting element for emitting an optical beam, and also includes a light receiving element for conducting a light amount correction and a synchronization detection. FIG. 4 is a diagram illustrating a schematic configuration of the LD unit 142. The LD unit 142 illustrated in FIG. 4 includes a laser chip 170 as the light emitting element and a PD (Photo Diode) 172 as the light receiving element which is arranged in a vicinity of the light emitting element.

Referring to FIG. 3, the LD drive part 154 controls the lighting by controlling a current flowing in the laser chip 170, and generates a light pulse sequence in accordance with an image signal. The PD unit 172 of the LD unit 142 receives light leaked from the laser chip 170, and also receives light being returned to the LD unit 142 in which the optical beam is emitted to outside the LD unit 142 and reflected by the polygon mirror 144. The synchronization detection signal generation part 156 receives a signal input from the PD 172 receiving the returning light, and output a synchronization detection signal DEPT which is used as a reference for writing an image, to the phase synchronization clock generation part 160 and the lighting control part 162 for the synchronization detection.

The writing clock generation part 158 generates a clock WCLK for conducting a lighting control of the LD unit 142, and outputs the clock WCLK to the phase synchronization clock generation part 160. The phase synchronization clock generation part 160 receives inputs of the synchronization detection signal DETP and the clock WCLK, and outputs a clock LCK synchronizing with a timing of the synchronization detection signal DEPT to the LD drive part 154 and the lighting control part 162 for the synchronization detection. In an initial unsynchronized state, the lighting control part 162 for the synchronization detection turns on an LD compulsory lighting signal BD to detect the synchronization detection signal DETP and controls the LD drive part 154 to blink the LD unit 142. Once the synchronization detection signal DETP is detected, the blink control part 162 for the synchronization detection generates the LD compulsory blink signal BD at a timing when the returning light reflected at the polygon mirror 144 enters the light receiving element of the LD unit 142, and controls the LD drive part 154 to lighting the LD unit 142.

Also, the LD unit 142 is controlled to light in response to the clock CLK under a control of the LD drive part 154, and emits the light pulse sequence in accordance with the image signal being input. The timing to start writing in accordance with the image signal may be determined to be after a time, which is set by a clock count unit concerning an arrangement of the light elements. That is, the synchronization detection signal DETP is referred to as a reference for regulating a timing to start an image writing for one main scan line.

The optical writing device 130 further includes a polygon motor control part 152. For example, a rotation number of the polygon motor is set in response to a print condition and a like. The printer control part 150 controls a rotation of the polygon motor for rotating the polygon mirror 144 to be a predetermined rotation number, in accordance with settings of the printer control part 150, and controls the polygon mirror 144 to rotate at a constant angular velocity. The optical beam emitted from the optical writing device 130 is deflected by the polygon mirror 144, passes the scan lens 146, and conduct a writing scan of an image from a predetermined location adjusted on the photosensitive drum 118K. It should be noted that even in a case of changing an angle velocity of the rotation of the polygon mirror 144, the LD drive part 154 can be controlled to start writing in accordance with an image signal after a time corresponding to the angle velocity of the rotation lapses from a timing when the returning light is detected.

An optical writing apparatus supporting a multi-color can be configured to include various optical elements and control parts illustrated in FIG. 3 for each color. Alternatively, the polygon mirror 144 and the polygon motor can be shared with a plurality of colors. In the following, each reflection surface of the polygon mirror 144 is used separately at the upper portion and the lower portion. In this example, a bidirectional scan type will be illustrated in that one reflection surface is shared by a combination of black (K) and cyan (C) and another reflection surface is shared by a combination of magenta (M) and yellow (Y).

Figure 5:
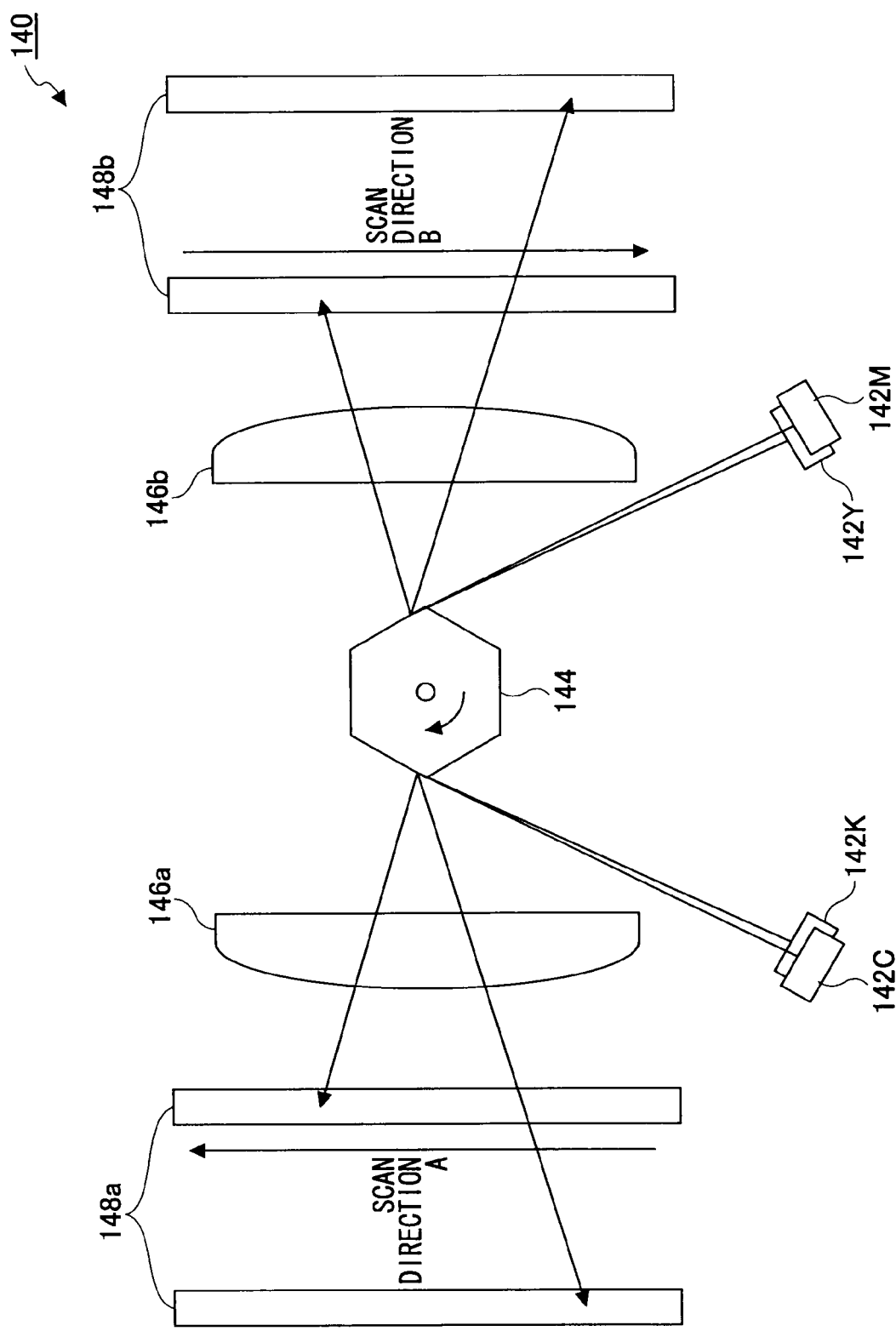
FIG. 5 is a diagram illustrating a schematic configuration of an optical unit of the optical writing apparatus.

FIG. 5 is a diagram illustrating a schematic configuration of the optical unit of the optical writing apparatus. The optical unit 140 includes LD units 142K, 142M, 142C, and 142Y for four colors, a polygon mirror 144 rotating at a constant angle velocity in a predetermined direction and deflecting an optical beam emitted from each of the LD units 142K through 142Y, scan lenses (fθ lenses) 146a and 146b for the optical beam deflected by the polygon mirror 144 to scan on a subject scan surface at the same speed, and first mirrors 148a and first mirror 148a and 148b forming reflecting mirror groups. In an example in FIG. 5, the polygon mirror 144 is configured to be a right hexagonal shaft having six reflection surfaces each of which is sectioned into an upper area and lower area to be used. As another embodiment, the polygon mirror 144 may be configured to be a polyhedral shaft.

The LD units 142K and 142Y for black and yellow illuminate optical beams on the lower portion of the reflection surface of the polygon mirror 144, and the LD units 142C and 142M illuminate optical beams on the upper portion of the reflection surface of the polygon mirror 144. The optical beams emitted from the LD units 142Y and 142M for yellow and magenta are reflected at the reflection surface of the polygon mirror 144, pass the scan lens 146b, are turned back by the first mirror 148b, and are scanned on the corresponding photosensitive drums by a rotation of the polygon mirror 144. The optical beams respectively enter the corresponding PDs 172 in the LD units 142Y and 142M as the returning light at the timing of perpendicularly entering the reflection surface of the polygon mirror 144 in a periodical scan.

Similarly, the optical beams emitted from the LD units 142K and 142C for black and cyan pass the scan lens 146a, are turned back by the first mirror 148a, and scanned on the corresponding photosensitive drums by a rotation of the polygon mirror 144. The optical beams respectively enter the corresponding PDs 172 in the LD units 142K and 142C as the returning light at the timing of perpendicularly entering the reflection surface of the polygon mirror 144 in the periodical scan. In this operation, by distributing the optical beams to two opposite directions as the polygon mirror 144 positions at a center, the optical beams for yellow and magenta illuminate in a scan direction B to be scanned on the corresponding photosensitive drums 118Y and 118M, and the optical beams for black and cyan illuminate in a scan direction A to be scanned on the corresponding photosensitive drums 118K and 118C, in which the scan directions A and B are opposite to each other.

Figure 6:
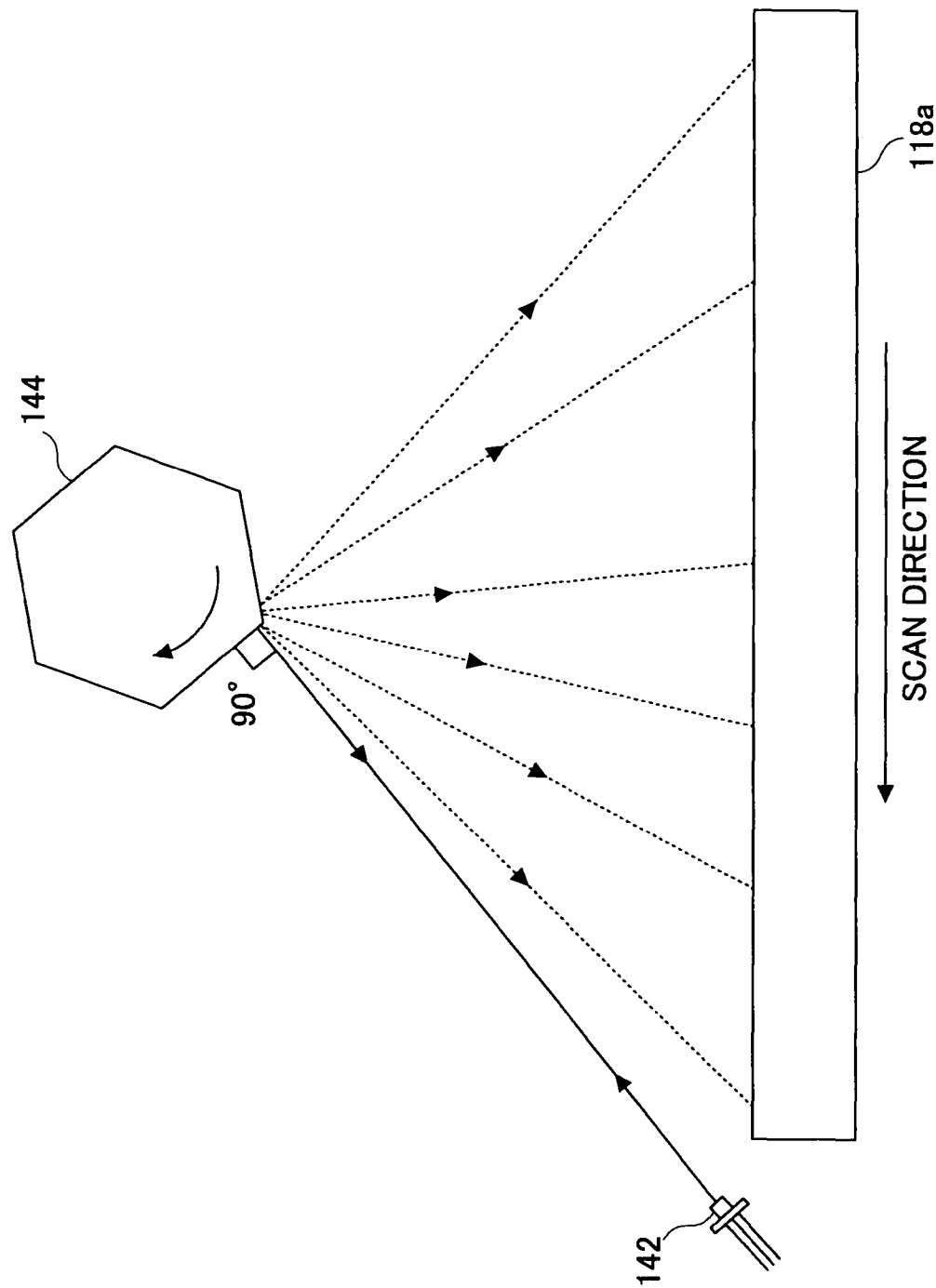
FIG. 6 is a diagram illustrating a scan state of an optical beam according to an rotation of a polygon mirror.

FIG. 6 is a diagram illustrating a scan state of the optical beam according to the rotation of the polygon mirror. In FIG. 6, suffixes such K, M, C, and Y are omitted. In the scan state illustrated in FIG. 6, The polygon mirror 144 includes the reflection surfaces to be perpendicular to a paper surface, and rotates to a clockwise direction with respect to the paper surface. The LD unit 142 emits an optical beam approximately parallel to a flat surface (the paper surface) perpendicular to a rotation axis of the polygon mirror 144, toward a first reflection surface of the polygon mirror 144. Arrangements and positions of the polygon mirror 144 and the LD unit 142 are adjusted, so that the optical beam emitted from the LD unit 142 at a specific timing perpendicularly enters and is reflected at the first reflection surface of the polygon mirror 144, and is turned back to the LD unit 142. A returning light is detected by the PD 172 inside the LD unit 142, and is used for a control of a light timing.

When the polygon mirror 144 is further rotated from a state in which the optical beam enters the first reflection surface at an angle of approximately 90 degrees (with respect to an incident angle of approximately zero degrees) as illustrated in FIG. 6, the optical beam enters a second reflection surface next the first reflection surface in a counterclockwise direction. When the polygon mirror 144 is further rotated, the incident angle becomes smaller, and the optical beam is deflected according to the rotation, and passes the scan lens and the mirror, so that a photosensitive drum surface 118a is scanned in a scan direction (indicated by an arrow in FIG. 6). In this case, the incidence angle is defined as an angle with respect to a normal line of the reflection surface.

In this embodiment, the optical writing apparatus 130 is configured so that the optical beam enters the first reflection surface at an angle of approximately 90 degrees (with respect to an incident angle of approximately zero degrees) in a state in that the polygon mirror 144 rotates at a predetermined angle, a returning light returns to the LD unit 142, and a signal output from a photodiode for receiving the returning light is used for the synchronization detection signal of the writing start side. Alternatively, in the optical writing apparatus 130 in another embodiment, one mirror is arranged not to shut out an optical beam emitted to a subject scan surface of the photosensitive drum 118, and another mirror is separately arranged and adjusted so that a normal line of the reflection surface is corresponded to an optical axis of the optical beam being reflected in a state in which the polygon mirror 144 rotates at a predetermined angle. A light reflected at another mirror is returned to the LD unit 142. In this case, this returning light may be used for a synchronization detection signal of a writing end side.

Figure 7:
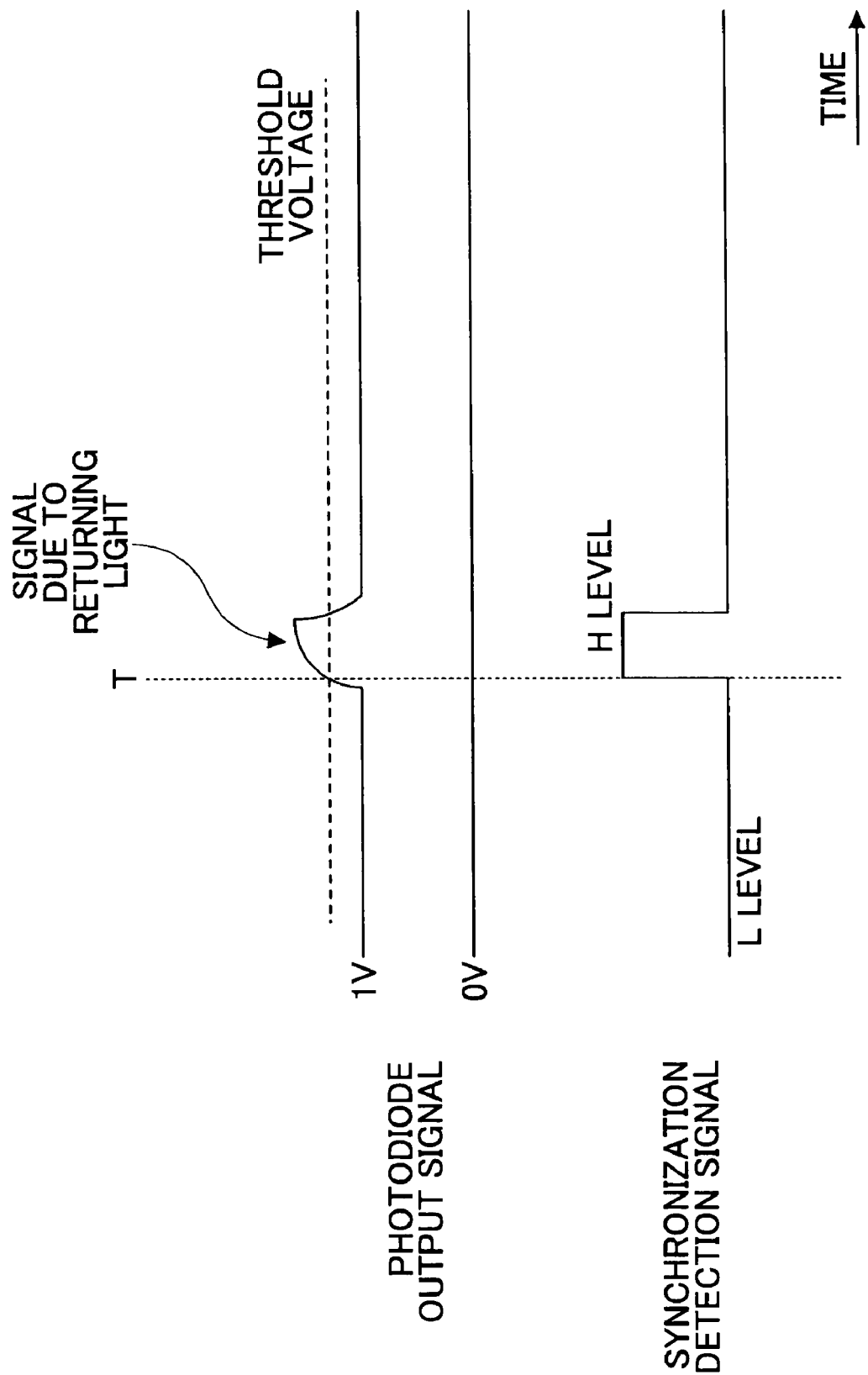
FIG. 7 illustrates a timing chart for a photodiode output signal and a synchronization detection signal.

In the following, the synchronization detection signal used as a reference of writing an image will be described. FIG. 7 illustrates a timing chart for a photodiode output signal and the synchronization detection signal. In FIG. 7, a time lapse is indicated by an arrow. A PD output signal is output as an analog signal in which a signal which is a leaking light from the laser chip 170 and an approximately constant level is superimposed with a signal of the returning light. The synchronization detection signal generation part 156 receives an analog output signal from the PD 172, digitalizes the analog output signal with a predetermined threshold voltage, and output a digitalized signal as the synchronization detection signal DETP to the phase synchronization clock generation part 160 and the lighting control part 12 for the synchronization detection. In a case in that the PD output signal responds with positive level with respect to a light amount, a rising timing of the synchronization detection signal DETP can be a timing T crossing the threshold voltage in a positive direction. A method for detecting a signal waveform with respect to the returning light is not limited to a specific method.

Figure 8:
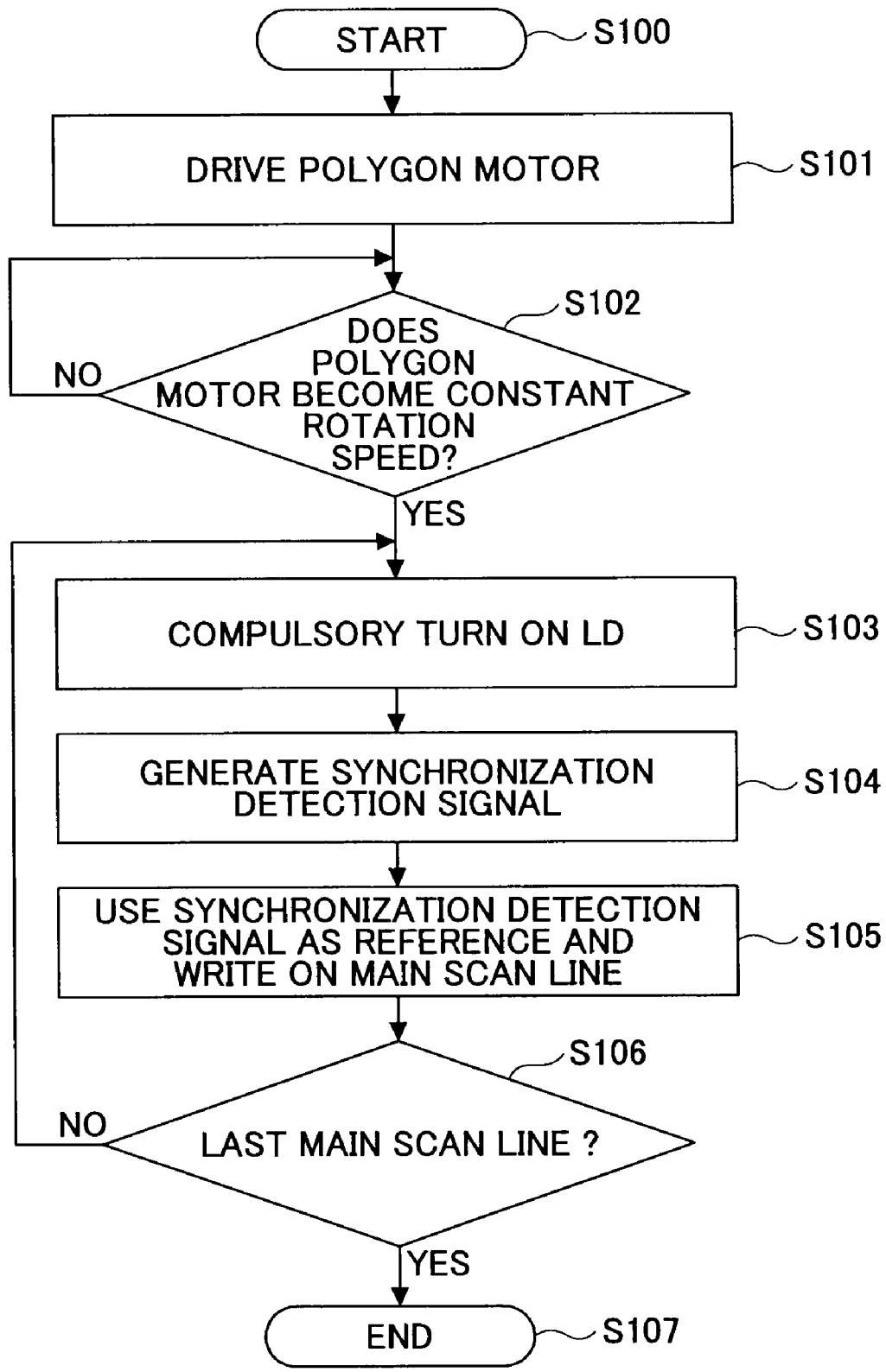
FIG. 8 illustrates a flowchart of an imaging operation performed by the optical writing apparatus according to the embodiment of the present invention.

FIG. 8 illustrates a flowchart of an imaging operation performed by the optical writing apparatus 130 according to the embodiment of the present invention. For example, when the optical writing apparatus 130 receives a print instruction from an operator via an operation panel, a process illustrated in FIG. 8 begins from a state S100. In a step S101, the polygon motor control part 152 drives a polygon motor. In a step S102, it is determined whether the polygon motor becomes a constant rotation number, and the process is looped until the rotation of the polygon motor becomes a steady state (during a "NO" state in the step S102).

In the step S102, when the rotation of the polygon motor becomes the steady state and the polygon mirror rotates at a constant angle velocity (YES), the process goes to a step S103. In the step S103, the lighting control part 162 for the synchronization detection turns on the LD compulsory lighting signal BD and turns on the LD. In a step S104, the PD 172 of the LD unit 142 receives the returning light, and the synchronization detection signal generation part 156 generates the synchronization detection signal DETP. Subsequently, in a step S105, the phase synchronization clock generation part 160 outputs the clock CLK synchronizing with the synchronization detection signal DETP to the LD drive part 154, and the LD drive part 154 controls the lighting of the LD unit 142 in response to the clock CLK and the image signal, the optical beam of the optical pulse sequence emitted from the LD unit 142 for one main scan line is deflected by the rotation of the polygon mirror 144. Accordingly, the optical beam sequentially illuminates an appropriate location on the photosensitive drum 118, and an area for one main scan line is exposed.

In a step S106, a location in the sub-scan direction is positioned at an edge of a writing area, and it is determined whether a main scan line being exposed is the last main scan line. In the step S106, when it is determined that the main scan line is not the last main scan line (NO), the process branches to step S103, the writing position is advanced in the sub-scan direction by rotating the photosensitive drum 118, and the step S103 through the step S106 are repeated until all main scan lines are exposed. On the other hand, in the step S102, when the location of the sub-scan direction is positioned at the edge of the writing area and the last main scan line is processed (YES), the process is branched to a step S107 and the imaging process is terminated.

In the above-described embodiment, in a scan of the optical beam, it is possible to generate the synchronization detection signal for regulating the writing timing in the main scan direction by using the PD for a light amount correction mounted in the LD unit 142. Accordingly, it is not required to separately provide the synchronization detection sensor. As a result, it is not required to make a space for the synchronization detection sensor, a space for the optical elements which direct light to the synchronization detection sensor, and a space for mounting this configuration. Thus, the apparatus configuration can be simplified and the optical writing apparatus can be provided with space saving and at a lower cost.

In the above, the embodiment is described in that for each color, the synchronization detection signal DETP is generated by using the PD 172 provided inside the LD unit 142, and the clock CLK is generated. Alternatively, in a case in that the polygon mirror 144 is shared with a plurality of colors, the synchronization detection signal DETP can be shared. In the following, a second embodiment of the optical writing apparatus will be described. In the second embodiment, one example case will be illustrated in that the synchronization detection signal DETP is shared among LD units for black (K) and cyan (C) which are colors scanned in the same scan direction.

Figure 9:
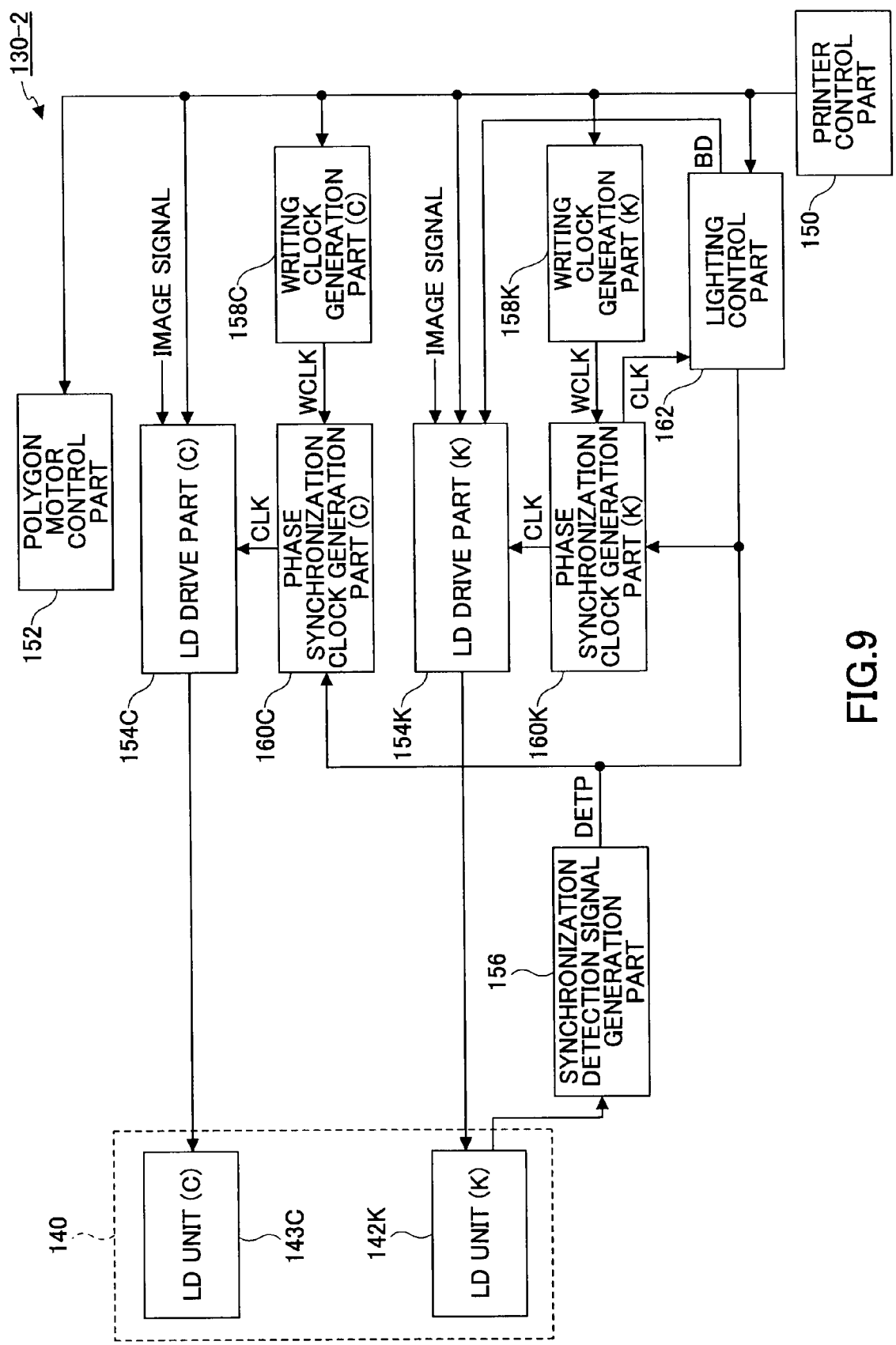
FIG. 9 is a schematic diagram illustrating another configuration of the optical writing apparatus.

FIG. 9 is a schematic diagram illustrating another configuration of the optical writing apparatus. A configuration concerning a combination of cyan (C) and black (K) with which the synchronization detection signal DETP is shared is illustrated in FIG. 9. A configuration of another combination of magenta (M) and yellow (Y) is similarly configured. The configuration of the optical unit 140 is the same as that illustrated in FIG. 5. An optical writing apparatus 130-2 illustrated in FIG. 9 includes an LD unit 142K including the PD 172, and a LD unit 143C which does not include a light receiving element. In the optical writing apparatus 130-2, the synchronization detection signal DETP generated from an output signal from PD of the LD unit 142K is used for the lighting control of the LD unit 143C.

The optical writing apparatus 130-2 includes a printer control part 150, LD drive parts 154K and 154C, writing clock generation parts 158K and 158C, and phase synchronization clock generation parts 160K and 160C, which are operated under a control of the printer control part 150. The optical writing apparatus 130-2 further includes a synchronization detection signal generation part 156 for receive a PD signal output from the LD unit 142K, and a lighting control part 162 for a synchronization detection. The synchronization detection signal generation part 156 outputs the synchronization detection signal DETP in accordance with a signal output from the PD provided inside the LD unit 142K, to the lighting control part 162 for the synchronization detection and the phase synchronization clock generation parts 160K and 160C respectively for black (K) and cyan (C).

When the LD drive part 154K for black receives an input of an LD compulsory control lighting signal DB from the lighting control part 162 for the synchronization detection, the LD drive part 154K controls the LD unit 142K to emit an optical pulse for the synchronization detection and to emit an optical pulse sequence for writing an image in response to an image signal. On the other hand, the LD drive part 154C for cyan controls the LD unit 143C to emit an optical pulse for writing the image in which a synchronization detection signal being the same as that for black is referred to. LD units for magenta (M) and yellow (Y), which are scanned in an opposite direction to cyan (c) and black (K), are configured as illustrated in FIG. 9. The light receiving element can be provided inside any one of the LD units for cyan (C) and black (K). The synchronization detection signal can be shared with any combination from cyan (C), magenta (M), yellow (Y), and black (K). Alternatively, only one of LD units for cyan (C), magenta (M), yellow (Y), and black (K) includes the light receiving element, and the synchronization detection signal can be shared with the LD units for four colors.

Further to advantages of the configuration illustrated in FIG. 3, in the configuration in FIG. 9, since the synchronization detection signal is shared with LD units for a plurality of colors, it is possible to reduce the number of the LD units which internally provide the PD. Accordingly, it is possible to reduce the cost of the optical writing apparatus.

As described above, according to the embodiment, without separately using the synchronization detection sensor, it is possible to conduct the lighting control of each laser diode at a proper timing so as to illuminate an optical beam at a location corresponding between scan lines. Accordingly, it is possible to provide the optical beam scanning apparatus and the digital writing apparatus realizing a space saving and a lower cost.

In the above-described embodiment, the optical writing apparatuses 130 and 130-2 include one main control part. In an alternative embodiment, the optical writing apparatuses 130 and 130-2 may include another control part for conducting various corrections among LD units for the plurality of colors, such as a correction process with respect to a variance of a writing location caused due to a change of an optical amount of the returning light depending on a change of an LD optical amount. In the above-described embodiment, instead of separately configuring the LD drive part 154 and the synchronization detection signal generation part 156, the LD drive part 154 may include a function of the synchronization detection signal generation part and may be configured as a circuit for entirely control the LD unit.

Moreover, in the above-described embodiment, the optical writing apparatus included in the laser printer is exemplified as the optical beam scanning apparatus. However, a use application of the optical beam scanning apparatus is not limited to this embodiment. In another embodiment, the optical writing apparatus can be applied as a digital writing apparatus included another image forming apparatus such as a digital composition apparatus. In a further embodiment, the optical writing apparatus can be applied as an optical beam scanning apparatus in a bar code reader, a display unit of an optical scan type, a laser process apparatus, or a like.

The present invention is not limited to the specifically disclosed embodiments, and variations and modifications may be made without departing from the scope of the invention.

The present application is based on the Japanese Priority Patent Application No. 2008-010479 filed Jan. 21, 2008, the entire contents of which are hereby incorporated by reference.

What is claimed is:

1. An optical beam scanning apparatus, comprising:
a laser source configured to emit an optical beam;
a polygon mirror configured to deflect the optical beam;
a light receiving part arranged in a vicinity of the laser source and configured to receive a returning light of the optical beam which is deflected toward the laser source by the polygon mirror;
a signal generation part configured to detect a timing at which the light receiving part receives the returning light, by an output signal from the light receiving part, and to generate a synchronization detection signal; and
an optical source drive part configured to conduct a lighting control of the laser source in response to the synchronization detection signal as a reference.

2. The optical beam scanning apparatus as claimed in claim 1, wherein the optical source drive part regulates a timing of a start of writing an image in accordance with an image signal being input in response to a deflection speed of the polygon mirror, in which a timing when the light receiving part receives the returning light is used as a reference.

3. The optical beam scanning apparatus as claimed in claim 1, further comprising a plurality of combinations of the laser sources and the laser source drive parts,
wherein the light receiving part is arranged in a vicinity of at least one of the laser sources, and
a plurality of the laser drive parts respectively conduct lighting controls of the laser sources in response to the synchronization detection signal as the reference which is shared with the plurality of the laser drive parts.

4. The optical beam scanning apparatus as claimed in claim 1, wherein the laser source and the light receiving part are internally mounted in a laser unit, the polygon mirror includes reflection surfaces for reflecting the optical beam and rotates at a predetermined angle velocity, and each of the reflection surfaces reflects the optical beam entering at approximately zero degrees with respect to a normal line of the reflection surface to direct the optical beam as the returning light to the light receiving part.

5. A digital writing apparatus, comprising:
a laser source configured to emit an optical beam;
a polygon mirror configured to deflect the optical beam;
an image formation part configured to be exposed to the optical beam deflected from the polygon mirror;
a light receiving part arranged in vicinity to the laser source and configured to receive a returning light of the optical beam which is deflected toward the laser source by the polygon mirror;
a signal generation part configured to detect a timing at which the light receiving part receives the returning light, by an output signal from the light receiving part, and to generate a synchronization detection signal; and an optical source drive part configured to conduct a lighting control of the laser source in response to the synchronization detection signal as a reference.

6. The digital writing apparatus as claimed in claim 5, wherein the optical source drive part regulates a timing of a start of writing an image in accordance with an image signal being input in response to a deflection speed of the polygon mirror, in which a timing when the light receiving part receives the returning light is used as a reference.

7. The digital writing apparatus as claimed in claim 5, further comprising a plurality of combinations of the laser sources and the laser source drive parts, wherein the light receiving part is arranged in vicinity of at least one of the laser sources, and a plurality of the laser drive parts respectively conduct lighting controls of the laser sources in response to the synchronization detection signal as the reference which is shared with the plurality of the laser drive parts.

8. The digital writing apparatus as claimed in claim 5, wherein the laser source and the light receiving part are internally mounted in a laser unit, the polygon mirror includes reflection surfaces for reflecting the optical beam and rotates at a predetermined angle velocity, and each of the reflection surfaces reflects the optical beam entering at approximately zero degrees with respect to a normal line of the reflection surface to direct the optical beam as the returning light to the light receiving part.

* * * * *